United States Patent
Callard et al.

(10) Patent No.: US 8,494,090 B2
(45) Date of Patent: *Jul. 23, 2013

(54) DETECTING THE NUMBER OF TRANSMIT ANTENNAS IN A BASE STATION

(75) Inventors: Aaron Callard, Ottawa (CA); Jianglei Ma, Kanata (CA)

(73) Assignee: Research In Motion Limited, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,184

(22) Filed: Sep. 10, 2012

(65) Prior Publication Data

US 2013/0003893 A1    Jan. 3, 2013

Related U.S. Application Data

(63) Continuation of application No. 12/221,867, filed on Aug. 7, 2008, now Pat. No. 8,290,088.

(60) Provisional application No. 60/954,357, filed on Aug. 7, 2007.

(51) Int. Cl.
   *H04L 7/06* (2006.01)
(52) U.S. Cl.
   USPC .......................................... 375/299; 375/340
(58) Field of Classification Search
   USPC ................ 375/150, 299, 365, 340; 370/203, 370/208, 350; 455/500; 714/758, 759, 760, 714/807
   See application file for complete search history.

(56) References Cited

U.S. PATENT DOCUMENTS

| | | | | |
|---|---|---|---|---|
| 8,135,359 | B2* | 3/2012 | Raaf et al. | 455/101 |
| 2002/0170013 | A1* | 11/2002 | Bolourchi et al. | 714/758 |
| 2004/0156464 | A1* | 8/2004 | Wu | 375/364 |
| 2007/0177569 | A1* | 8/2007 | Lundby | 370/349 |
| 2008/0181163 | A1* | 7/2008 | Ye et al. | 370/312 |
| 2009/0067378 | A1* | 3/2009 | Luo et al. | 370/329 |
| 2009/0149207 | A1* | 6/2009 | Zhang et al. | 455/500 |
| 2009/0176463 | A1* | 7/2009 | Raaf et al. | 455/101 |
| 2009/0219858 | A1* | 9/2009 | Liang et al. | 370/328 |
| 2011/0013730 | A1* | 1/2011 | Mansson et al. | 375/340 |
| 2012/0076102 | A1* | 3/2012 | Ko et al. | 370/329 |

OTHER PUBLICATIONS

R1-071406, "Comparison of encoding and blind detection of P-BCH antenna configuration information", 3GPP TSG RAN WG1 #48bis, Huawei, St. Julian's, Malta, Mar. 26-30, 2007.*

R1-071628, "S-SCH Structure for E-UTRA Downlink", 3GPP TSG RAN WG1 # 48bis, NTT DoCoMo, Mitsubishi Electric, Sharp, Toshiba Corporation, St. Julian's, Malta, Mar. 26-30, 2007.*

* cited by examiner

*Primary Examiner* — Aristocratis Fotakis

(57) ABSTRACT

Data is scrambled at a transmitter according to one of a number of predetermined scrambling sequences which are associated with a particular one of a number of predetermined transmit antenna diversity schemes (i.e., a specific number of transmit antenna ports). Received data is decoded using one or more of the known transmit antenna diversity schemes and the scrambled data is descrambled according to a corresponding descrambling sequence (related to the scrambling sequence). Based on the descrambled data, the receiver determines which transmit antenna diversity scheme (i.e., the number of antenna ports) is used by the transmitter. In one specific embodiment, CRC parity data is scrambled in the transmitter and the receiver descrambles the recovered CRC parity data according to a descrambling sequence, computes CRC parity data from the received data, and compares the descrambled CRC parity data to the newly computed CRC parity data.

20 Claims, 4 Drawing Sheets

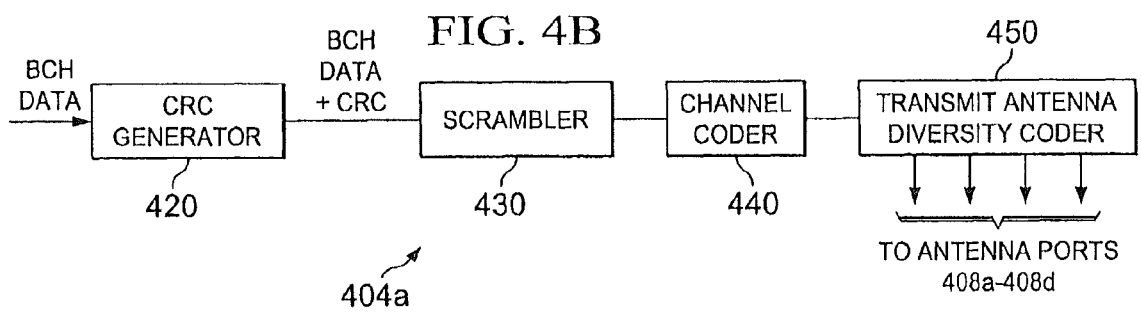
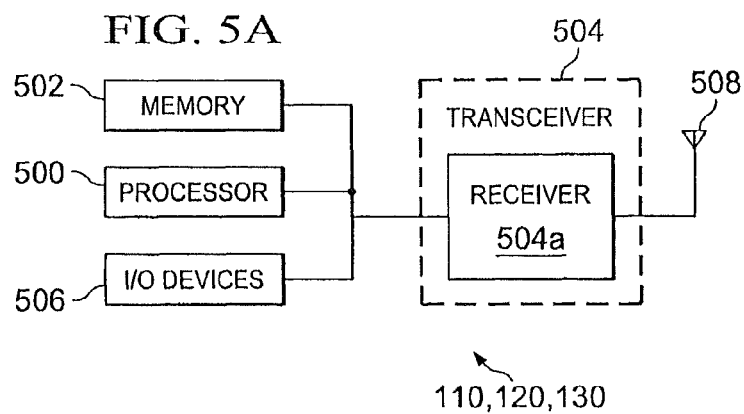

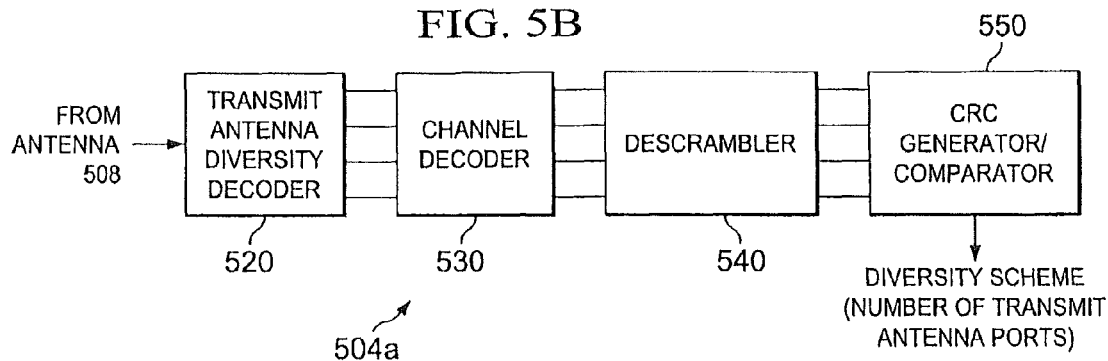
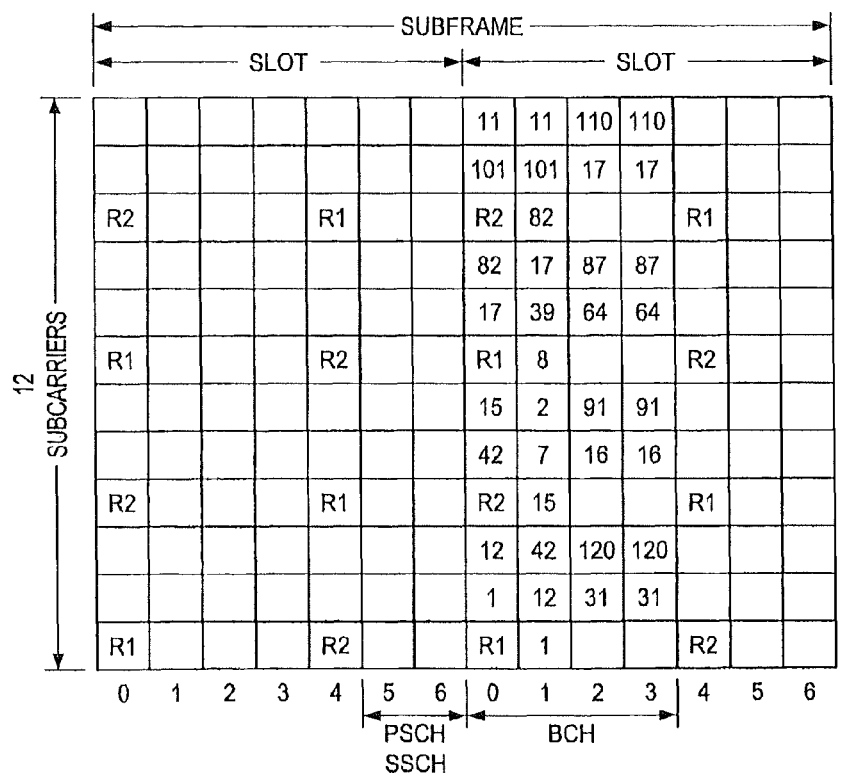

DETECTING THE NUMBER OF TRANSMIT ANTENNAS IN A BASE STATION

CROSS-REFERENCE TO RELATED APPLICATION(S) AND CLAIM OF PRIORITY

The present application is a continuation of U.S. patent application Ser. No. 12/221,867, entitled "DETECTING THE NUMBER OF TRANSMIT ANTENNAS IN A BASE STATION", filed on Aug. 7, 2008 now U.S. Pat. No. 8,290,088, which claims priority to U.S. Provisional Patent No. 60/954,357, filed Aug. 7, 2007, the entirety of all of which are incorporated herein by reference. Application Ser. No. 12/221,867 is assigned to the assignee of the present application and is hereby incorporated by reference into the present application as if fully set forth herein. The present application hereby claims priority under 35 U.S.C. §120 to U.S. patent application Ser. No. 12/221,867.

TECHNICAL FIELD OF THE INVENTION

The present application relates generally to wireless communication systems, and, more specifically, to user equipment and base stations, and methods for detecting the number of transmit antennas utilized in a base station (e.g., access point) during a communication session.

BACKGROUND OF THE INVENTION

The third generation partnership project (3GPP) is developing a Long Term Evolution (LTE) specification for the purpose of facilitating deployment of broadband services and applications wirelessly.

LTE is designed for uplink speeds up to 50 Mbps and downlink speeds of up to 100 Mbps for high speed data and media transport. Bandwidth will be scaleable from 1.25 MHz to 20 MHz. This will provide different network operators the ability to have different bandwidth allocations and provide different services based on spectrum. The provision of such an arrangement of scaleable bandwidth is expected to allow carriers to provide increased data and voice services over a given bandwidth, since bandwidth can be more properly matched to the needs of a given application than has heretofore been possible.

LTE employs advanced technologies that are relatively new to wireless cellular networks, including orthogonal frequency division multiplexing (OFDM) and multiple input multiple output (MIMO) antenna technologies. The uplink utilizes single carrier frequency division multiple access (SC-FDMA) while the downlink employs orthogonal frequency division multiple access (OFDMA). The basic operation and technical description of LTE may be found in the current draft of the 3GPP LTE specification, 3GPP (or 3G) Release 8, including 3GPP TX 36.XXX V8.3.0 (2008 May), which are incorporated herein by reference. The operation and technical description of UMTS may be found in the current draft of the UMTS specification, SGPP TS 25.XXX, which is incorporated herein by reference.

LTE transmissions are segmented into frames of 10 mSec duration. Each frame is divided into 10 sub-frames each having two slots. Within each slot, a number of OFDM symbols (6 or 7) are transmitted. The transmitted downlink signal includes N subcarriers (15 KHz) for a duration of M OFDM symbols (typically 6 or 7) which may be represented by a resource grid. FIG. 1 shows an exemplary resource grid illustrating a sub-frame with two slots (time; x dimension) and twelve subcarriers (frequency; y dimension). Each slot includes seven OFDM symbols (0 thru 6). As will be appreciated, the total number of subcarriers will depend on the overall transmission bandwidth.

Each block within the grid is referred to as a resource element (RE). Reference signals/symbols (R) (not shown in FIG. 1) are transmitted during certain OFDM symbols of each slot and transmitted every sixth subcarrier (resulting in staggered Rs in both time and frequency).

In OFDMA, users are allocated a specific number of subcarriers (frequency) for a predetermined amount of time. These are referred to as physical resource blocks (PRBs) which are allocated using a scheduling function. A PRB is defined as 12 consecutive subcarriers for one slot.

Within an LTE communication system, base stations may utilize one of a number of available antenna diversity schemes based on the number of transmit antenna ports for downlink transmission to the user equipment (UE). In the currently drafted standard, three antenna diversity schemes are provided which correspond to 1, 2 or 4 transmit antenna ports. These may also be referred to as "sets" of transmit antenna ports. While this configuration is exemplary, the base station may have any number (2 or greater) of transmit antenna ports and thus, may operate in one of a number of diversity schemes. The UEs include one or more antennas and transceivers enabling receipt signals transmitted according to the antenna diversity scheme (e.g., 1, 2 or 4 transmit antenna ports). Knowing the number of base station transmit antennas (antenna configuration) is critical information for the UE because it is necessary to decode data transmission correctly after initial access. For example, utilization of two or four base station transmit antenna ports, as compared to one, increases system data rates, reliability and/or quality of service.

Within the present LTE standard, the synchronization channel(s) do not carry any transmit antenna configuration information. Under the current scheme, the UE detects the number of transmit antenna ports by determining which transmit antenna diversity scheme is being deployed. Each of the three base station transmission modes (e.g., using 1, 2 or 4 transmit antenna ports) has its own antenna diversity scheme: 1 (Single Input Multiple Output, or SIMO), 2 (Spatial Frequency Block Code, or SFBC) and 4 (Spatial Frequency Block Code—Frequency Switched Transmit Diversity, or SFBC-FSTD). By detecting the appearance of reference signal (R) subcarriers corresponding to the respective transmit antenna ports, the transmit antenna configuration can be determined by the UE. However, the reliability of such blind detection method is poor.

For the two and four transmit antenna modes, the SFBC-based transmit diversity schemes may be applied to a broadcast channel (BCH) which is transmitted within a predetermined portion of each 10 mSec frame (e.g., as a portion of the frame). As currently proposed in the LTE specification, the BCH is transmitted in the first sub-frame (sub-frame 0) of each frame and included within OFDM symbols 0 thru 3 in slot 2. The primary and secondary synchronization signals are transmitted in the first and sixth sub-frames (sub-frame 0 and sub-frame 5) and included within OFDM symbols 5 and 6 within slot 1 of these sub-frames. This is illustrated in FIG. 2 which shows an example resource grid for sub-frame 0 containing the BCH and synchronization channels when transmitting using 2 transmit antenna ports.

The reference signals are denoted "R1" for transmit antenna port #1 and "R2" for transmit antenna port #2. As is understood, the resource elements identified as R2 are unused in antenna port #1 transmissions and those identified as R1 are unused in antenna port #2 transmissions. It will be appreciated that in this diversity scheme (using 2 transmit antenna ports), the resource elements for transmit antenna ports #3 and #4 within the BCH are unused and denoted with an "X".

The data transmitted in the BCH contains vital system and access configuration information the UE requires in order to access the system, such as system bandwidth, system frame number, basic configuration required for further decoding of other information/data, and configuration information for various operational features. This channel typically utilizes a low coding rate as well as 16-bit cyclic redundancy check (CRC). This system and access configuration information may be referred to as the BCH transport block data. Thus, the data transmitted in the BCH includes two distinct segments: the transport block data and CRC parity bits (computed from the transport block data). It was expected that reception of the BCH would allow the UEs to determine the number of transmit antenna ports in the base station by recognizing the antenna diversity scheme.

However, under the proposed scheme, the number of transmit antenna ports cannot be adequately detected solely on the basis of the different transmit diversity schemes. This is because each transmission scheme has a large portion of its signal which is identical for all the transmit antenna diversity schemes. Below is a representation of the three proposed schemes (SIMO (1 antenna port), SFBC (2 antenna ports) and SFBC-FSTD (4 antenna ports)):

$$1 \text{ antenna } (SIMO): \begin{bmatrix} S_1 & S_2 & S_3 & S_4 \end{bmatrix}$$

$$2 \text{ antennas } (SFBC): \begin{bmatrix} S_1 & S_2 & S_3 & S_4 \\ -S_2^* & S_1^* & -S_4^* & S_3^* \end{bmatrix}$$

$$4 \text{ antennas } (SFBC\text{-}FSTD): \begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$$

The columns represent different neighboring subcarriers while the rows represent transmission from different transmit antenna ports. Between SIMO and the SFBC transmission fully half of the transmission (e.g., transmit antenna port #1) is identical. This is also true to a lesser extent between SIMO and SFBC-FSTD where the first two signals ($S_1$ and $S_2$ for transmit antenna port #1) are identical. Because the coding rates of the BCH is extremely low (approximately $\frac{1}{14}$), UEs with even moderately good channels will be able to correctly decode the BCH using the incorrect number of transmit antenna ports (or diversity scheme). In operation, the UEs decode the BCH using each of the three possible schemes, perform CRC operation on the decoded data, and compare it to the received CRC. It is possible that a UE may correctly decode the BCH using the incorrect number of transmit antenna ports. Therefore, the UE may determine that the base station is transmitting using one scheme (1, 2 or 4 transmit antenna ports), when in fact, it is transmitting using a different scheme. Additionally, any method which is based on the relative structure of these signals would fail when either one of the antennas channels is in deep fade, or two of the antennas channels are very similar to each other.

Accordingly, there is needed a more robust and reliable method of detecting the number of base station transmit antennas to improve antenna configuration detection performance.

SUMMARY OF THE INVENTION

In accordance with one embodiment, there is provided a method of generating and transmitting transmit antenna port information from a transmitter enabling a remote communications device to determine a number of transmit antenna ports active in the transmitter. The method includes generating data for transmission to a remote communication device and scrambling data bits of the generated data according to one of a number of predetermined scrambling sequences. Each of the scrambling sequences corresponds to a defined number of transmit antenna ports operating within the transmitter. The method further includes transmitting the scrambled data bits within a data frame to the remote communication device.

In another embodiment, there is provided a communications device (e.g., base station) for communicating with a remote communication device in a wireless network. The communications device includes a processor and memory coupled to the processor and operable for storing a number of scrambling sequences. A transmitter is capable of wirelessly transmitting data to the remote communications device using one set of a predetermined number of sets of transmit antenna ports, where each set of transmit antenna ports corresponding to a different antenna diversity scheme. The transmitter includes a scrambler for scrambling data bits to be transmitted in accordance with a one of the stored scrambling sequences, where each of the scrambling sequences is associated with a different one of the sets of transmit antenna ports.

In accordance with another embodiment, there is provided a method for receiving a signal at a receiver from a remote transmitter device and determining a number of transmit antenna ports in the remote transmitter device. The method includes receiving a signal from a remote transmitter device and antenna diversity decoding the received signal into a first diversity decoded signal using one of a number of predetermined antenna diversity schemes, where each diversity scheme corresponding to a different number of transmit antenna ports. Received scrambled data bits within the first diversity decoded signal are descrambled using one of a number of predetermined de-scrambling sequences corresponding to the plurality of possible diversity schemes. The descrambled data bits are used to determine the number of transmit antenna ports used to transmit the received signal from the remote transmitter device.

In yet another embodiment, there is a communications device for receiving a signal from a remote transmitter in a wireless network. The communications device includes a processor; memory coupled to the processor and operable for storing a plurality of descrambling sequences; and a receiver capable of wirelessly receiving the signal transmitted from the remote transmitter using one set of a predetermined number of sets of transmit antenna ports, where each set of transmit antenna ports corresponding to a different antenna diversity scheme. The receiver includes a descrambler for descrambling received scrambled data bits using one of the plurality of stored descrambling sequences, where each of the plurality of descrambling sequences corresponds to a different one of the sets of transmit antenna ports. The receiver is also capable of detecting from the descrambled data bits the number of transmit antenna ports used to transmit the received signal from the remote transmitter.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4B is a block diagram of certain components within a transmitter shown in FIG. 4A;

FIG. 5A is a block diagram of a user equipment device shown in FIG. 3;

FIG. 5B is a block diagram of certain components within a receiver shown in FIG. 5A; and FIG. 6 depicts an example resource element grid illustrating broadcast channel data repeated within the broadcast channel where the repeated symbols are placed near each other in the time and/or frequency domain.

DETAILED DESCRIPTION OF THE INVENTION

Figure 1:
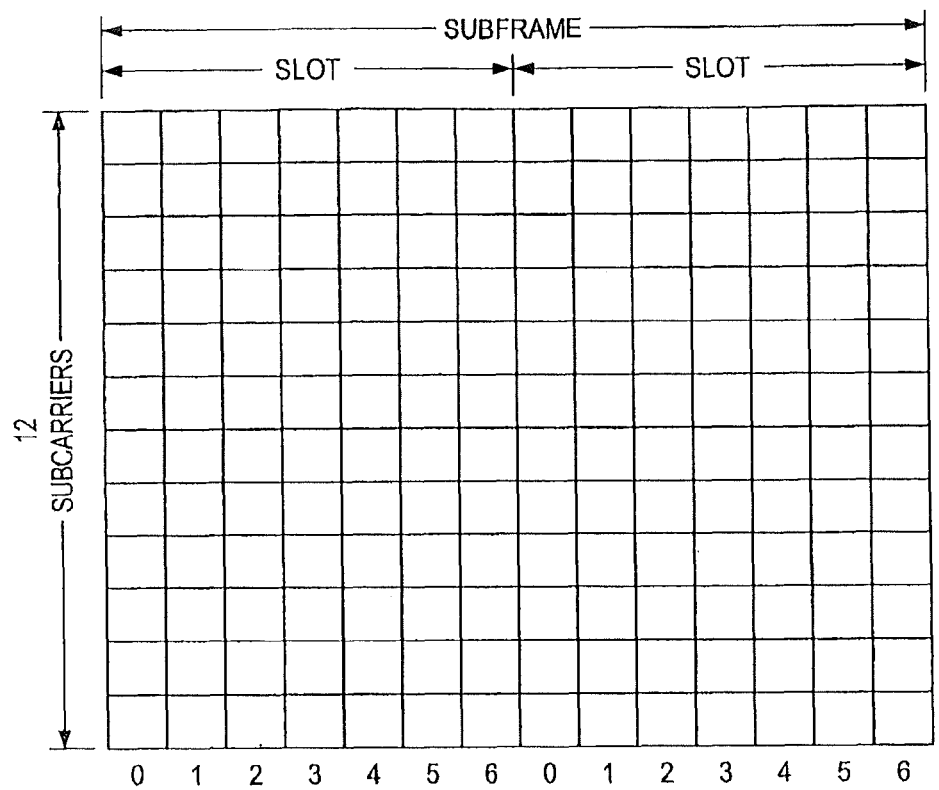
FIG. 1 depicts a generic resource grid that represents a portion of a downlink signal.
Figure 3:
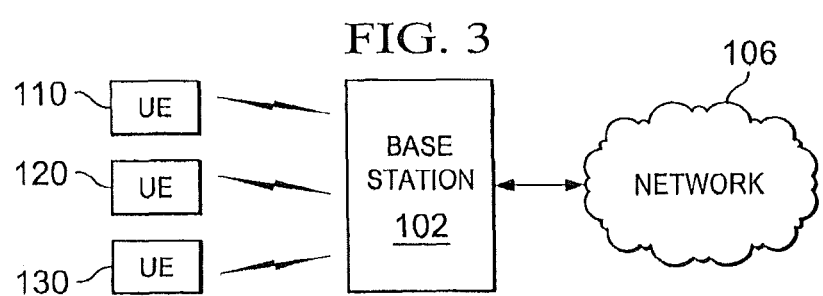
FIG. 3 depicts a high level diagram of an example communications cell and devices within a wireless communications network.
Figure 2:
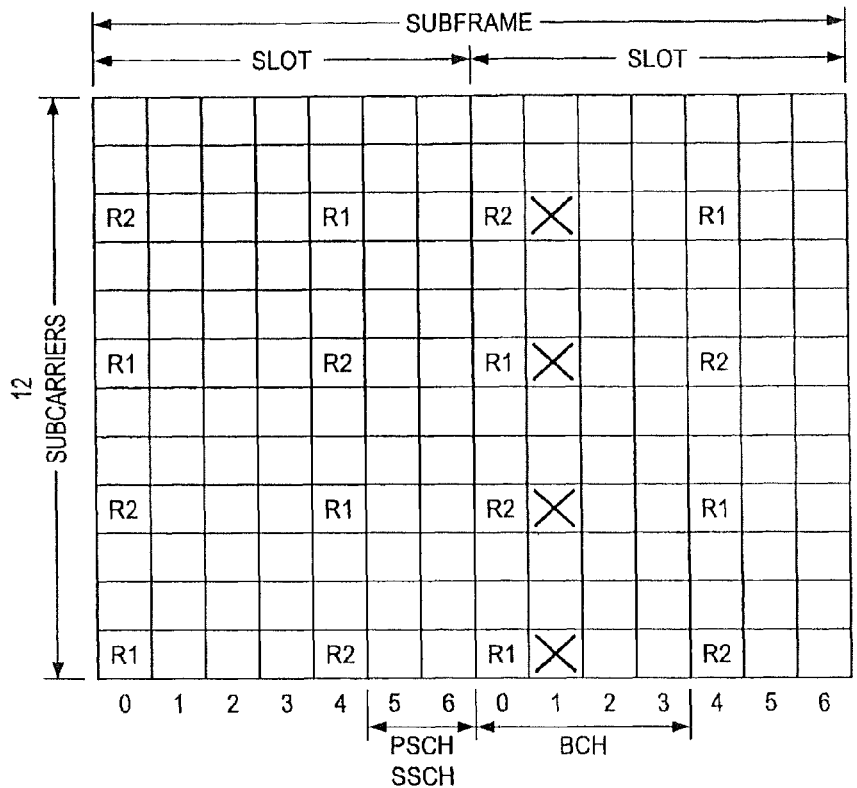
FIG. 2 depicts a similar resource grid illustrating locations of reference signals, a broadcast channel and synchronization channels.

FIG. 1 illustrates an example communications network architecture or system 100 in accordance with the present disclosure. The system or network 100 shown in FIG. 1 is for illustration purposes only, and represents a cell or sector. Other embodiments of the system 100 may be used without departing from the scope of this disclosure. Reference to "standards" or "specifications" in the text is meant to encompass existing and future version of the referenced standards or specifications encompassing the principles of the subject matter disclosed and claimed herein.

In this example, the system 100 is part of (or communicates with) a larger communication services network 106, and the system 100 includes a base station (BTS) 102 communicating wirelessly with a plurality of user equipment stations (UE) 110, 120 and 130. In one embodiment, the access services network (not shown) and system 100 (or portions thereof) is a wireless communications network compliant or operating in accordance with the 3GPP LTE standard or specification, including the UMTS standard with LTE specification (or later versions). Although only one BTS 102 is shown, the system 100 may, and typically would, include additional BTSs and additional user equipment stations. Each of the BTS 102 and UEs 110, 120, 130 generally include one or more antennas and various hardware and software components.

The network 106 may include one or more local area network ("LAN"), metropolitan area networks ("MAN"), wide area network ("WAN"), all or portions of a global network, or any other communication system or systems at one or more locations, or combination of these, including the public switched telephone network (PSTN), Internet, packet networks and the like. The network typically also includes a BTS backhaul network (not shown) which is a data network utilized for communications between the BTSs and mobile switching centers (MSCs) and/or gateways. These networks may be configured to include Internet, packet networks and the like.

Other components, devices or networks may be included in the system 100 (and network 106), and FIG. 1 only illustrates but one exemplary configuration to assist in describing the system and operation of the present disclosure to those skilled in the art. The system represented in FIG. 1 may be described using different nomenclature or system terminology, such as use of the term "user equipment" (UE), "access terminal" (AT) or "mobile subscriber terminals (MS or MT), and "base station", "base transceiver station" (BTS), "node B" and "eNode B", and the use of any given nomenclature to describe a device within the system 100 is not intended to limit the scope of this disclosure.

The BTS 102 ahs coupled thereto the UEs (several shown). The UEs are operable for communicating wirelessly with the BTS 102 over an air interface.

The structure and functionality of a conventional BTS is generally well-known. A conventional BTS generally includes various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional components and software processes (functionality) of a BTS, other than as notes herein are relevant for an understanding of the present disclosure, as such are well known to those of ordinary skill in the art. It will be understood that the BTS 102 may be constructed or configured from any suitable hardware, software, firmware, or combination thereof for providing the functionality known to those of ordinary skill in the art. The BTS 102 will include additional functionality as described below in accordance with one or more embodiments.

The UEs 110, 120, 130 represent devices utilized by a user or subscriber during communication sessions over/within the system 100. The UEs typically include a processor, memory, a transceiver and an antenna and may be constructed or configured from any suitable hardware, software, firmware, or combination thereof for transmitting or receiving information over a network. These devices may further include an input/output device having a microphone and speaker to capture and play audio information, as well as a camera and/or a display to capture/display video information. As an example, the UEs may be a telephone, videophone, computer, personal digital assistance, e-mail device, "smart phone" and the like, or other devices intended to receiver/transmit wirelessly to the base station. No additional description of the conventional components and software processes (functionality) of the UEs 110, 120, 130, other than as noted herein or relevant for an understanding of the present disclosure, is provided, as these are known to those of ordinary skill in the art. It will be understood that the UEs 110, 120, 130 may be constructed or configured from any suitable hardware, software, firmware, or combination thereof for providing the functionality known to those of ordinary skill in the art. The UEs 110, 120, 130 will include additional functionality as described below in accordance with one or more embodiments.

In general terms, the present disclosure describes a method of transmitting data from a transmitter (e.g., within a base station) to one or more UEs and determining the number of transmit antenna ports in use by the transmitter.

In operation, to access the network, a UE obtains system and access configuration information from data transmitted within a control channel (e.g., the BCH) broadcast as part of the 10 mSec frames. To properly decode the data, the UE needs to determine how many transmit antenna ports the transmitter is using (i.e., needs to know which transit antenna diversity scheme is used). At the base station, the transmitter is operating in one of a plurality of transmit antenna diversity schemes or modes. Each transmit antenna mode depends on the number of transmit antenna ports in operation.

In one specific embodiment, the transmitter may selectably operate in one of three diversity schemes corresponding to 1, 2 or 4 transmit antenna ports. In other embodiments, the transmitter may operate in accordance with any one of a number of diversity schemes, with each scheme utilizing a different number of transmit antenna ports. Though it may be possible for two or more of the known diversity schemes to utilize the same number transmit antenna ports, it may be more desirable for each scheme to use a different number of transmit antenna ports.

Depending on the operating mode (scheme), data to be transmitted is coded according to a predetermined transmit diversity scheme (as described above) that is known by the base stations and the UEs within the network. For example, if the transmitter transmits through two (2) transmit antenna ports (in the SFBC mode), the data to be transmitted is coded into a first format using [S1, S2, S3, S4] and transmitted over transmit antenna port #1 while the data to be transmitted is also coded into a different format using [−S2*, S1*, −S4*, S3*] and transmitted over transmit antenna port #2.

Prior to coding and transmitting the BCH transport block data, the transmitter calculates/computes CRC parity bits (CRC) using the block data and appends the computed CRC to the BCH transport block data. Thus, the transmitted BCH data includes two distinct segments or portions: the BCH transport block data and the CRC parity bits. Before transmission, a scrambling sequence (i.e., modulation) is applied to all or a portion of the BCH data bits. The applied scrambling sequence depends on the number of transmit antenna ports in use. In one specific embodiment, the scrambling sequence is applied to all bits of the computed CRC parity bits. In other embodiments, the scrambling sequence may be applied to data bits representing all or a portion of the BCH data, the CRC, or combination thereof, as desired.

As will be appreciated, the bit scrambling may be accomplished using any known scrambling sequence (or otherwise modulated in a known manner). With knowledge of the scrambling sequences that may be applied at the base station, the original CRC parity bits may be recovered by the UE and this information is thereafter used to determine the number of base station transmit antenna ports used for transmitting.

It will be understood that a linear scrambling sequence may be utilized. Further, scrambling may be applied those BCH data bits at any point in the transmit processing party (i.e., prior to coding, after coding, or in between coding processes if more than one coding step is performed), provided the UE de-scrambles at the appropriate point in the receive processing path.

For illustrative purposes, let's assume the BCH carries a total of X bits of data including Y bits of transport block data and C bits of CRC parity. In this example, a predetermined C-bit mask or scrambling sequence is applied to the original CRC parity bits to generate a scrambled CRC, and the transport block data bits and scrambled CRC bits are transmitted to the UEs within the BCH. Though any number X, Y and C bits may be utilized, in one embodiment shown below, C equals 16. In another embodiment, X equals 64.

The specific scrambling technique may vary, and in one embodiment, the original CRC bits are modulated, using base 2 arithmetic, with the predetermined mask (or code). The CRC bits are scrambled according to the base station transmit antenna port configuration in the table below.

TABLE I

CRC mask for BCH

| Number of transmit antenna ports | BCH CRC mask |
|---|---|
| 1 | <0000000000000000> |
| 2 | <1111111111111111> |
| 3 | <0101010101010101> |

According to the embodiment above, when the base station transmits using only one transmit antenna port, a logic zero is added to each CRC bit which results in a scrambled CRC with data bit values equal to the original CRC bits. When the base station transmits using only two transmit antenna ports, a logic one is added to each CRC bit which results in a scrambled CRC with data bit values inverted (or complement) from the original CRC bits. When the base station transmits using four transmit antenna ports, alternating logic zeros and ones are added to each alternating CRC bit which results in a scrambled CRC with data bit values with alternating original and inverted/complement data bit values. This is illustrated by the equation $c(k)=(p(k)+x(k)) \bmod 2$, for $k=0, 1, 2, \ldots 15$, where c equals the resulting scrambled CRC bits, p equals the original CRC parity bits, and x equals the mask bits.

On the receive side, and as noted previously, the UE originally does not know how many base station transmit antenna ports, and therefore what diversity scheme is being used for the downlink transmission. Therefore, the UE decodes the BCH according to the known possible transmit antenna diversity schemes, recovers the BCH data (transport block data and appended CRC), de-scrambles the recovered CRC, computes a CRC on the recovered BCH transport block data, and compares the unscrambled CRC to the recovered CRC. Based on this process, the UE is able to effectively and reliably determine the actual number of transmit antenna ports transmitting from the base station (and thus the actual transmit antenna diversity scheme utilized.

Operation of the system 100 (for an understanding of the present disclosure) and general block diagrams of the BTS 102 and the UEs 110, 120, 130 will now be described.

Figure 4A:
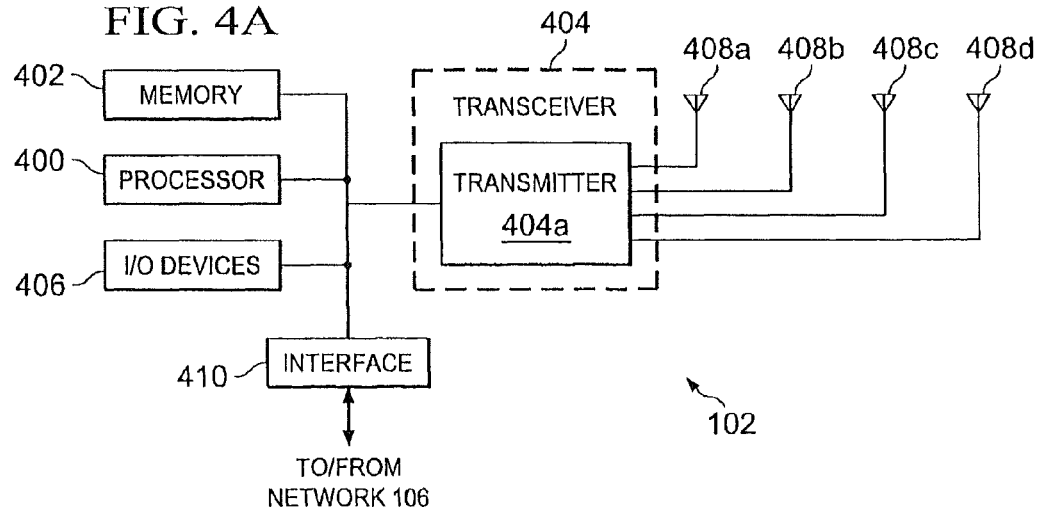
FIG. 4A is a block diagram of a base station shown in FIG. 3.

Now turning to FIG. 4A, there is shown a block diagram of the BTS 102 in accordance with the present disclosure. The BTS 102 includes a processor (which may include a digital signal processor) 400, a memory 402, a transceiver 404 having a transmitter 404a and a receiver (not shown), input/output devices 406, and four antennas 408a, 408b, 408c, 408d, respectively, representing the transmit antenna ports. Other components may be included, but not shown. Details of the operation and structure of these components, except as necessary to illustrate the operations and methods described herein, have been omitted. The BTS 102 also includes an interface 410 for communicating with the network 106. Though four transmit antenna ports 408a-408d are shown in FIG. 4, the BTS 102 may generally include two or more such ports. In addition, the transceiver 404 may includes multiple transmitters and/or receivers. Typically, the transmitter 404a includes a digital signal processor, analog transmitter circuitry, logic circuitry and other components (though not shown).

As will be appreciated, the memory 402 stores the predetermined scrambling sequences, as well as each sequence's association to a given transmit antenna diversity scheme.

Even though the transmitter 404a is shown operating as part of a wireless base station, the transmitter 404a and processes performed by the transmitter 404a may be utilized and included in other types of wireless communication devices.

It will be understood that the transmit antenna ports 408a-408b may be individual physical antennas, one or more portions of one or more physical antenna (e.g., an array of an antenna array), and may be logical in nature. As such, the transmit antenna ports are typically differentiated by utilization of specific reference signals (e.g., R1, R2, R3, R4) at different locations within the data frames transmitted, and could represent different coded orthogonality, polarization or phase differences, and the like. Multiple transmit antenna ports work together to form antenna diversity, but are not defined by them.

Now turning to FIG. 4B, the transmitter 404a includes a CRC generator 420, a scrambler 430, a channel coder 440 and a transmit antenna diversity coder 450. The transmitter 404a generates (or receives) BCH transport block data. Any number of CRC parity bits may be computed and different redundancy schemes may be used. In one specific embodiment, the CRC generator computes a 16-bit CRC.

The scrambler 430 receives and scrambles the computed CRC parity bits (all or a portion thereof) in accordance with a selected one of a number of predetermined scrambling sequences or masks (hereinafter referred to as a "mask"). Each mask corresponds to a given number of transmit antenna ports (or antenna diversity schemes). One specific embodiment for a set of antenna configuration masks (see Table I) and a scrambling method (modulo 2 addition) has been described above, however, a person of ordinary skill in the art will understand that other embodiments and configurations of masks and scrambling methods may be implemented.

It will soon be understood that the scrambler block 430 may optionally scramble all or a portion of the BCH transport data, all or a portion of the CRC parity bits, or a combination thereof, in accordance with the selected mask.

After scrambling, the BCH information bits consisting of the PCH transport data and scrambled bits (CRC or otherwise) is channel coded, such as by convolution encoding, by the channel coder 440. The encoded bits are provided to the transmit antenna diversity coder 450 which processes and codes the data stream in accordance with the desired diversity scheme or code (resulting in transmission using 1, 2 or 4 transmit antenna ports). The diversity coded signal(s) (e.g., 1, 2 or 4) are then transmitted via the antenna(s) 408a-408d. Though not shown, it will be understood that the data symbols are mapped to the appropriate time/frequency locations, along with reference signal and data from other channels (symbols). These mapped time/frequency symbols are converted into a time domain symbol (i.e., using an FFT and CP insertion in standard OFDM methodology.

Other components (not shown) may be provided within the transmit path for provide additional functions, such as modulation, rate matching, and RF signal generation. Further, it will be appreciated that the order of the components or processes for processing data bits in the transmit path may be varied, as desired, and other configurations can be used.

Now turning to FIG. 5A, there is shown a block diagram of a UE 110, 120, 130 in accordance with the present disclosure. The UE includes a processor (which may include a digital signal processor) 500, a memory 502, a transceiver 504 having a receiver 504a and a transmitter (not shown), input/output devices 506, and an antenna 508. Other components may be included, but not shown (such as a network interface). Similarly, details of the operation and structure of these components, except as necessary to illustrate the operations and methods described herein, have been omitted.

As will be appreciated, the memory 502 has stored the predetermined descrambling sequences (corresponding to the scrambling sequences used in the transmitter), as well as each sequence's association to a given transmit antenna diversity scheme.

Though a single transceiver and antenna are shown, the UE may include multiple transceivers and/or antennas. Typically, the receiver 504a includes a digital signal processor, analog transmitter circuitry, logic circuitry and other components (though not shown). Even through the receiver 504a is shown operating as part of the wireless UEs 110, 120, 130, the receiver 504a and processes performed by the receiver 504a may be utilized and included in other wireless communication devices.

Now turning to FIG. 5B, the receiver 504a includes a transmit antenna diversity decoder 520, a channel decoder 530, a de-scrambler 540, and CRC generator/comparator 550. As will be appreciated, the decode processing in the receiver 504a path is essentially the reverse of the code processing in the transmitter 404a.

The UE receives an RF signal (carrying a data frame) transmitted from the BTS 102. The received RF signal is composed of one or more RF signals transmitted from a device, such the base station 102 having transmitter 404a, using one or more transmit antenna ports. The composition of the RF signal depends on the antenna diversity scheme implemented in the transmitting device.

In one process, the received signal is decoded by the transmit antenna diversity decoder 520 using the known transmit diversity scheme [S1, S2, S3, S4]. The diversity decoded data is delivered to the channel decoder 530 for channel decoding and the PCH data (including the transport block data and scrambled CRC) is determined (or attempted to be recovered). The de-scrambler 540 applies a descrambling sequence, corresponding to the scrambling sequence (and mask) used by the transmitter for the transmit diversity scheme [S1, S2, S3, S4], to the received scrambled CRC to unscramble and recover the original CRC parity bits.

The CRC generator/comparator 550 calculates a CRC based on the decoded BCH transport block data and compares the descrambled CRC to the calculated CRC. If there is a match, the UE determines that the base station 102 is transmitting using only one transmit antenna port—identifying the antenna diversity scheme utilized by the transmitter 404a. Once the number of transmit antenna ports is determined, the UE applies the corresponding antenna diversity scheme to subsequent transmissions from the base station 102 enabling proper decoding.

As will be appreciated, the mask and descrambling method applied to the scrambled CRC will be chosen to properly recover the original CRC. In one specific embodiment, the set of antenna configuration masks (see Table I) and the descrambling method (modulo 2 addition) as used in the transmitter 404a is also used in the UE.

In the second process, the received signal is decoded by the transmit antenna diversity decoder 520, but this time using the second known transmit diversity scheme which includes both [S1, S2, S3, S4] and [−S2*, S1*, −S4*, S3*]. The two diversity decoded signals are processed by the channel decoder 530, the descrambler 540 and the CRC generator/comparator 530 (as described above). Similarly, if matching occurs (e.g., the unscrambled CRCs with the calculated CRCs), the UE determines that the base station 102 is transmitting using only two transmit antenna ports.

When using the above process for scrambling CRC bits (e.g., one or more bits) transmitted from a transmitter to a receiver, even if the received bits are per perfectly detected when using an incorrect antenna diversity scheme, the likelihood of a correct CRC pass is quite small thus increasing the reliability of detection.

It will be understood that the received signal may be processed sequentially using each of the known antenna diversity schemes. In this manner, if the direct diversity scheme processed results in a match of computed CRC and the unscrambled recovered CRC, the diversity scheme used by the transmitter is properly detected. No further detection processing is necessary. In another embodiment, the received signal may be replicated with each being processed in parallel using all of the known antenna diversity schemes. Parallel processing may be faster, but may require more computational resources. Sequential processing may be advantageous, especially when the first antenna diversity scheme tested as a significantly higher likelihood of being used. As will be appreciated, in the described sequential processing, any one of the known schemes may be tested first. Further, in one embodiment, the receiver maintains a log and records the number of times each of the possible diversity schemes is used in operation. Based on this, the receiver may dynamically modify its detection process by choosing the most probably diversity scheme based on historical data to be tested first, and so on.

In an alternative approach, utilization of resource element (RE) mapping that is dependent on the number of transmit antenna ports may be used. Though similar to the above described scrambling sequence process, by changing the RE mapping to be dependent on the number of transmit antenna ports, a correct CRC pass can be made very unlikely. Within this approach, there are two strategies. The first strategy is for the change in RE mapping to an ordered cyclic shift, so that the decoding complexity can be reduced. The second strategy is to provide for a more random rearrangement.

By introducing a scrambling sequence process described above, the way that different sequences are detected generally requires decoding the full sequence and checking the CRC. This typically also requires that channel estimation, decoding and CRC checking be performed for each transmit antenna diversity scheme. To further increase reliability, reduce the likelihood of false positives (detecting a CRC pass for a signal which has been decoded using the wrong diversity scheme) and/or decrease the computational intensity, utilization or specific scrambling sequences may be used in conjunction with RE mapping. This may help reduce the number of calculations performed at the UE and improves the effectiveness of the BCH CRC.

In LTE, low coding rates are achieved by repetition coding of a mother rate ⅓ code. The basic premise is to take advantage of the significant amount of repetition within the BCH coding structure to indicate the number of transmit antenna ports. If repeated symbols are placed close to each other in either the frequency or time domain and scrambling sequences are used which are equivalent to BPSK modulation, then a simpler correlation can detect the number of transmit antenna ports.

For illustration purposes, assume that forty (40) information bits are transmitted in the BCH. With four (4) OFDM symbols assigned to the BCH, even using RS pattern associated with four transmit antenna ports, 216 REs are available. This corresponds to a repetition of 3.6. By assigning the repeated bits such that, when possible, subcarriers in OFDM symbols 0 and 1 (slot 1) and OFDM symbols 2 and 3 (slot 2) of the sub-frame share the same repeated symbol, a phase rotation between the repeated symbols may be detected. The phase rotation in this instance is equivalent to multiplication by +1, or −1, which is in turn equivalent to a specific bit level scrambling sequence. To transmit the three different possibilities for the number of transmit antenna ports, the phase rotations are broken into two elements: one indicating either 1 or more transmit antenna ports and another indication either 2 or 4 transmit antenna ports.

It is believed that reliability of this phase detection is much better than the BCH detection (using a scrambling sequence dependent on the number of transmit antenna ports) and, further, has no detrimental affect on the reliability of the BCH data.

The RE mapping for this approach can be relatively arbitrary, as long as pairs of repeated symbols are placed "near" to each other in either time or frequency (preferably both) and where the same antenna mapping would occur. "Near" typically means within the coherence bandwidth/coherence time of the channel and depends on the deployment. Now referred to FIG. 6, there is shown an example RE grid illustrating BCH data repeated within the BCH where the repeated symbols are placed near each other.

In yet another approach (not using a scrambling sequence and/or RE remapping), a reliability measurement process at the UE may be performed. In this method, all three antenna diversity schemes are decoded (as described above) and a measure of how reliable these decoded versions are is taken from the decoder. This reliability measure may include determining a minimum weight at the output of a Viterbi decoder. In this method, the UE would perform full decoding for all antenna diversity schemes. For each scheme that passed the CRC, a measure of the relative accuracy of this decoding would be considered. One option would be the value of the minimum node in the Viterbi decoder of the BCH data. The scheme which had the smallest weight, which corresponds to the most reliable reception, would be assumed correct. When the multiple transmit antenna diversity schemes (hypotheses) are used to decode the same BCH, the hypotheses with the strong reliability measure is assumed true. This may increase the complexity of the receiver because the process cannot have an early stopping criteria and must always decode all hypotheses.

The present disclosure describes a transmitter that transmits a transmit antenna configuration dependent data structure. In other words, a given set of data that is to be transmitted to a receiver is organized or modulated in one particular way for a first transmit antenna configuration (e.g., when only 1 transmit antenna port is used) and in a different way for a second transmit antenna configuration (e.g., when only 2 transmit antenna ports are used), and other or additional configurations may be used, if desired. This way, the receiver can distinguish between the two possible transmitter modes (Mode 1: Only 1 antenna port; Mode 2: Only 2 antenna ports). Thus, the data structure transmitted on the antenna port(s) is "dependent" on the transmit antenna configuration. The data structure "dependency" (or the change in the data structure(s) that can be detected by the receiver) can be accomplished in different ways, including use of scrambling sequences, RE remapping, repeating certain symbols in a defined pattern or way, or interleaving (e.g., reordering of channels or groups of bits within the data frame). These dependent data structure(s) are generated in addition to the coding (reordering of symbols) done by the use of typical transmit antenna diversity schemes that are known. Therefore, the data structure of the transmitted data can be detected at the receiver which provides the information that identifies the configuration used by the transmitter.

In some embodiments, some or all of the functions or processes of the one or more of the devices are implemented or supported by a computer program that is formed from computer readable program code and that is embodied in a computer readable medium. The phase "computer readable program code" includes any type of computer code, including source code, object code, and executable code. The phase "computer readable medium" includes any type of medium capable of being accessed by a computer, such as read only memory (ROM), random access memory (RAM), a hard disk drive, a compact disc (CD), a digital video disc (DVD), or any other type of memory or storage medium.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    scrambling a plurality of bits of broadcast channel data using a first scrambling sequence when a transmitter operates with only one transmit antenna and using a second scrambling sequence when the transmitter operates with only two transmit antennas, wherein the first scrambling sequence indicates one transmit antenna operation and the second scrambling sequence indicates two transmit antenna operation; and
    transmitting the plurality of scrambled bits within a data frame to a remote communication device,
    wherein transmitting the plurality of scrambled bits further comprises transmitting the plurality of scrambled bits within a primary broadcast channel in accordance with a Long Term Evolution (LTE) standard.

2. The method of claim 1, wherein the broadcast channel data comprises transport data and cyclic redundancy check (CRC) data, wherein the CRC data is computed based on the transport data.

3. The method of claim 1, further comprising generating the broadcast channel data.

4. The method of claim 1, wherein the plurality of scrambled bits are transmitted using a plurality of resource elements.

5. The method of claim 1, wherein the primary broadcast channel uses seventy-two subcarriers.

6. A communications device for communicating with a remote communication device in a wireless network, the communications device configured to:
    scramble a plurality of bits of the broadcast channel data using a first scrambling sequence when the communications device operates with only one transmit antenna and using a second scrambling sequence when the communications device operates with only two transmit antennas, wherein the first scrambling sequence indicates one transmit antenna operation and the second scrambling sequence indicates two transmit antenna operation; and
    transmit the plurality of scrambled bits within a data frame to the remote communication,
    wherein the communications device transmits the plurality of scrambled bits within a primary broadcast channel in accordance with a Long Term Evolution (LTE) standard.

7. The communications device of claim 6, wherein the broadcast channel data comprises transport data and cyclic redundancy check (CRC) data, wherein the CRC data is computed based on the transport data.

8. The communications device of claim 6, further configured to generate the broadcast channel data.

9. The communications device of claim 6, wherein the plurality of scrambled bits are transmitted using a plurality of resource elements.

10. The communications device of claim 6, wherein the primary broadcast channel uses seventy-two subcarriers.

11. A method for use with long term evolution (LTE) broadcast channel data, the method comprising:
    scrambling at least a portion of the LTE broadcast channel data; and
    transmitting at least the scrambled LTE broadcast channel data using at least one antenna, wherein the scrambling sequence used for scrambling is dependent upon the number of antenna used for said transmitting, the scrambling sequence associated with a particular number of antennas is unique, and the scrambled LTE broadcast channel data is transmitted within a data frame,
    wherein transmitting at least the scrambled LTE broadcast channel data further comprises transmitting at least the scrambled LTE broadcast channel data within a primary broadcast channel in accordance with a Long Term Evolution (LTE) standard.

12. The method of claim 11, wherein scrambling at least a portion of LTE broadcast channel data comprises scrambling the portion of LTE broadcast channel data using a first scrambling sequence when said transmitting uses only one antenna and using a second scrambling sequence when said transmitting uses only two antennas.

13. The method of claim 11, wherein the LTE broadcast channel data comprises transport data and cyclic redundancy check (CRC) data, wherein the CRC data is computed based on the transport data.

14. The method of claim 11, further comprising generating the LTE broadcast channel data.

15. The method of claim 11, wherein the primary broadcast channel uses seventy-two subcarriers.

16. A communications device for transmitting Long Term Evolution (LTE) broadcast channel data to a remote communication device in a wireless network, the communications device configured to:
    scramble at least a portion of the LTE broadcast channel data; and
    transmit at least the scrambled LTE broadcast channel data using at least one antenna, wherein the communications device scrambles the at least a portion of LTE broadcast channel data using a scrambling sequence based on the number of antenna used for transmitting, the scrambling sequence associated with a particular number of antennas is unique, and the scrambled LTE broadcast channel data is transmitted within a data frame,
    wherein the communications device is configured to transmit at least the scrambled LTE broadcast channel data within a primary broadcast channel in accordance with a long term evolution (LTE) standard.

17. The communications device of claim 16, wherein the communications device is configured to scramble the at least a portion of LTE broadcast channel data using a first scrambling sequence when the communications device transmits using only one antenna and using a second scrambling sequence when the communications device transmits using only two antennas.

18. The communications device of claim 16, wherein the LTE broadcast channel data comprises transport data and cyclic redundancy check (CRC) data, wherein the CRC data is computed based on the transport data.

19. The communications device of claim 16, wherein the communications device is further configured to generate the LTE broadcast channel data.

20. The communications device of claim 16, wherein the primary broadcast channel uses seventy-two subcarriers.

* * * * *